(12) United States Patent
Yamawaki

(10) Patent No.: US 6,926,499 B2
(45) Date of Patent: Aug. 9, 2005

(54) THIN-WALLED, LIGHTWEIGHT COOLED TURBINE BLADE

(75) Inventor: Shigemichi Yamawaki, Chiyoda-ku (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 0 days.

(21) Appl. No.: 10/695,867

(22) Filed: Oct. 30, 2003

(65) Prior Publication Data

US 2004/0091360 A1 May 13, 2004

(30) Foreign Application Priority Data

Nov. 13, 2002 (JP) ......................... 2002-329258

(51) Int. Cl.[7] ............................................. F01D 5/08
(52) U.S. Cl. ................................ 416/97 R; 416/234
(58) Field of Search ............................. 416/97 R, 234, 416/243

(56) References Cited

U.S. PATENT DOCUMENTS 3,220,697 A   11/1965   Smuland et al.
3,542,486 A * 11/1970   Adiutori et al. .......... 416/90 R
6,241,469 B1   6/2001   Beeck et al.
2002/0018717 A1 * 2/2002   Dailey ....................... 416/97 R

FOREIGN PATENT DOCUMENTS

| GB | 805015 | 11/1958 |
| GB | 0846583 A | 8/1960 |
| GB | 2 279 705 A | 1/1995 |
| GB | 2 365 497 A | 2/2002 |
| JP | 08-028203 | 1/1996 |

OTHER PUBLICATIONS

UK Search Report, dated Feb. 23, 2004.
Random House Webster's college dictionary, 1991, p. 1125.

* cited by examiner

Primary Examiner—Ninh H. Nguyen
(74) Attorney, Agent, or Firm—Griffin & Szipl, P.C.

(57) ABSTRACT

A blade 10 is composed of a front blade portion 10a, a rear blade portion 10b and a middle blade portion 10c. The belly side of the middle blade portion 10c forms a recess towards the back side. High-temperature gas flowing along the belly side of the blade 10 branches once at the front edge portion to the rear edge portion and alongside the belly side, into separate flows. These separated high-temperature gas flows are merged again at the rear edge portion, thereby a separation region S is formed.

4 Claims, 2 Drawing Sheets

THIN-WALLED, LIGHTWEIGHT COOLED TURBINE BLADE

BACKGROUND OF THE INVENTION

1. Technical Field of the Invention

The present invention relates to a cooled turbine blade provided with a film cooling hole to form a thin film of cooling air on the surface of a turbine member.

2. Description of the Related Art

FIG. 1 is a typical structural view of a turbo jet engine provided with an air intake 1, a compressor 2, a combustor 3, a gas turbine 4, an after-burner 5, and a jet nozzle 6. In this turbo jet engine, air is introduced from the air intake 1 and is compressed in the compressor 2; and, in the combustor 3, fuel is fired to produce a high-temperature combustion gas, the gas turbine 4 is driven by the produced combustion gas, compressor 2 is driven by this gas turbine 4, the after-burner 5 burns the fuel again using an exhaust gas from the turbine, the high-temperature fuel exhaust gas is expanded in the jet nozzle 6 and jetted out backwards, thus a thrust is generated. This configuration is same in a jet engine other than the turbo jet engine.

It is known in the prior art that with the aforementioned jet engine or any other gas turbine, a higher turbine inlet temperature can be applied by cooling the turbine blade of the gas turbine, thereby the performance of the gas turbine can be improved. Consequently, in addition to conventional convection cooling, impinge cooling, film cooling, transpiration cooling, or any other cooling means are provided to cool the turbine blades.

FIG. 2 is a sectional view showing an example of a conventional cooling turbine blade. In this example, a cooling air flow passage is provided in the interior of a turbine blade 4a, the cooling air that passes through this cooling air passage, impinge-cools the inner surface of the turbine blade 4a and blows out through air cooling holes 7 (film cooling holes) disposed on the back and belly sides of the turbine blade 4a and forms a thin film of cooling air on the surface of the turbine blade 4a, thus the air cools the film (for an example, see Patent Literature 1).

In this application, the back side means a suction side of a blade, and the belly side means a pressure side thereof.
[Patent Literature 1]
Unexamined Japanese patent publication No. 28203, 1996

The turbine blade rotates at a high speed, and the higher the speed, the more efficiently the blade generates power. However, the rotating speed is limited by the strength of the turbine disk that supports the blade. That is, most of the power applied to the disk comes from a centrifugal force acting on the rotating turbine blade, so eventually the total weight of the turbine blade determines a limit of rotating speed. Therefore, the lighter the weight of the turbine blade is, the more advantageous it is. However, because a means for cooling the turbine blade must be provided, a passage has to be provided to pass cooling air inside the blade. Therefore, the turbine blade should have a predetermined thickness. Consequently, the weight of the blade has necessarily been increased. In addition, to have good aerodynamic performance, it is required to have a large difference in flow speed between the back and belly sides of the turbine blade. That is, a considerable thickness must be provided. Therefore, it is difficult to develop a light, thin-walled turbine blade.

SUMMARY OF THE INVENTION

The present invention aims to solve the above-mentioned problems. In other words, the purpose of the present invention is to provide a thin-walled, light-weight, and cooled turbine blade by reducing the weight of the turbine blade and increasing a rotating speed of the turbine, so that the performance of the gas turbine can be improved.

The present invention provides a thin-walled, lightweight, and cooled turbine blade composed of a front blade portion (10a) that configures the front portion of a blade (10), which is composed of a front blade cooling air passage (12a) to pass cooling air and front film cooling holes (7a) for blowing out the cooling air introduced into the aforementioned front cooling air passage (12a) out to the back and belly sides of the above-mentioned blade (10), a rear blade portion (10b) constituting the rear portion of the above-mentioned blade (10), and a solid middle blade portion (10c) that is located between the above-mentioned front blade portion and the rear blade portion and constitutes an intermediate portion of the aforementioned blade (10); the belly side of the above-mentioned middle blade portion (10c) forms a recess portion towards the back side; a high-temperature gas flowing on the belly side of the above-mentioned blade (10) branches once at the front edge portion towards the rear edge portion and the belly portion, while being separated, and then these separated high-temperature gas flows are merged again at the rear edge portion, thereby forming a separation region (S).

According to the thin-walled light cooled turbine blade of the present invention, because middle blade portion (10c) and rear blade portion (10b) can be structured with thin walls and solid structure, the weight of the turbine blade can be reduced and the rotating speed of the turbine can be increased, thus the performance of the gas turbine can be improved.

According to a preferred embodiment of the present invention, the aforementioned rear blade portion (10b) is provided with in the interior thereof, a rear cooling air passage (12b) for passing cooling air, and rear film cooling holes (7b) that blow out the cooling air introduced into the above-mentioned rear cooling air passage (12b) out to the back and belly sides of the above-mentioned blade (10).

Thus, because the rear edge portion is film-cooled by the cooling air blown out of the rear film cooling holes (7b), the cooling performance of the rear edge portion can be improved.

Either or both of the aforementioned middle blade portion (10c) or/and the above-mentioned rear blade portion (10b) is or are provided with communication holes (8) that supply part of the cooling air blown out of the aforementioned front film cooling holes (7a) to the back side of the above-mentioned blade (10) from the belly side thereof.

As a result of the above, the back side of blade (10) can be film-cooled by the cooling air blown out of communication holes (8), so the cooling performance of the back side of blade (10) can be improved.

As means of cooling the turbine blade, there are the aforementioned means of cooling air into the blade interior, and means of blowing out cooling air onto the blade surface for film-cooling. For cooling the rear end portion of the blade, where a satisfactory blade thickness cannot be provided, the blowing out air from slot-shaped cooling holes is most effective. Because it is expected that the blade can be cooled by film cooling even if the blade is composed of a solid, thin-walled structure, instead of a hollow structure.

Also, due to the need to assure a predetermined blade thickness in view of aerodynamics as mentioned above, the inventor invented a thin-walled, lightweight cooled turbine blade by making the blade thickness of the section where there are two isolated air flows much thinner than conventional blade thickness, thereby realizing a lighter structure than before. It is based on the fact that at the belly side of the front edge portion of the blade, a high-temperature gas flow is separated once and merged again at the rear edge portion, the section with isolated flows can be assumed to have a similar flow potential as a thick-walled blade shape, as revealed by a recent study, aiming at solving the above-mentioned problems.

Consequently, according to the present invention as mentioned above, part or most of the turbine blade can be made with a thin-walled, solid structure, thus the weight of the blade can be reduced, and as the rotation speed of the turbine can be improved, the performance of the gas turbine can be improved.

Other objects and advantages of the present invention are revealed by the following description referring to the attached drawings.

DESCRIPTION OF PREFERRED EMBODIMENTS

Figure 1:
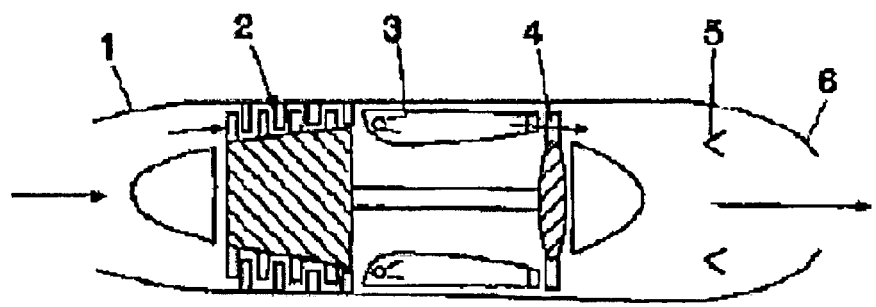
FIG. 1 is a typical structural view of a turbo jet engine.

Embodiments of the present invention are described below referring to the drawings. In each drawing, the same numbers are used throughout for common portions.

Figure 3:
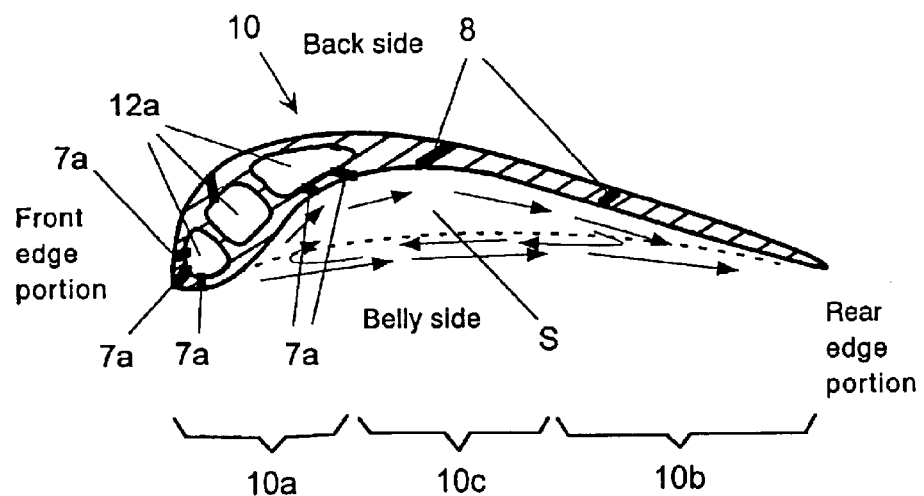
FIG. 3 is a typical sectional view showing the first embodiment of a turbine blade according to the present invention.

FIG. 3 is a typical sectional view of the thin-walled lightweight cooled turbine blade according to the first embodiment of the present invention.

The thin-walled lightweight cooled turbine blade 10 comprising a front blade portion 10a constituting a front portion of the blade 10, a rear blade portion 10b constituting a rear portion of the blade, and a middle blade portion 10c located between the front blade portion and the rear blade portion and constituting an intermediate portion of the blade 10.

The front blade portion 10a comprised of a front cooling air passage 12a that passes cooling air and front film cooling holes 7a for blowing out the cooling air introduced into this front cooling air passage 12a, out to the back and belly sides of blade 10.

The middle blade portion 10c is a solid structure.

At the blade portion of this thin-walled solid structure, there are a plurality of communication holes 8 for supplying part of cooling air blown out of the front film cooling holes 7a, to the back side from the belly side of blade 10.

In this embodiment, although the front cooling air passage 12a is composed of three air passages, the number can be changed appropriately. A plurality of front film cooling holes 7a are provided at the front edge portion, back side, and belly side.

Figure 2:
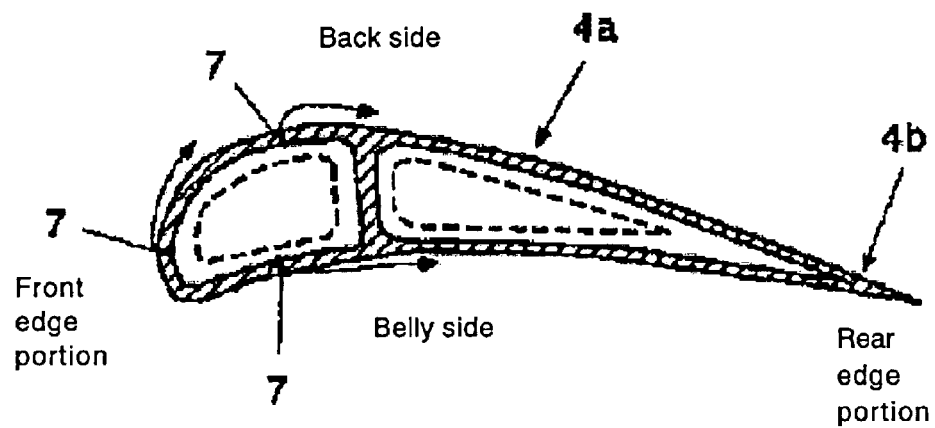
FIG. 2 is a typical sectional view of a conventional turbine blade.

The belly side of blade 10 is shaped such that the belly side of a conventional turbine blade 4a shown in FIG. 2 is cut away. That is, the belly side of the middle blade portion 10c is formed in a recess portion S towards the back side, and is thin-walled. By means of such a shape, high-temperature gas entering from a combustor is separated once into the direction of the rear edge portion 10b and the portion along the belly side, at the belly side of the front edge portion 10a of the turbine blade 10, thereby gas flows are isolated once and merged again at the belly side of the rear edge portion 10b. In the region where these flows are isolated (separation region S), a flow potential can be achieved that is the same as a thick-walled blade shape.

Therefore, in a section where there are isolated flows of high-temperature gas, the conventional thick-walled blade shape is no longer required, so the blade can be made much thinner than a conventional blade, thus a maximum of about 50% of weight can be reduced. Furthermore, when the weight of a turbine blade is reduced by 50%, assuming that the rotating speed of the turbine can be raised until the same centrifugal force as with the 100% weight acts on the turbine disk, the rotating speed of the turbine can be increased by 40% from conventional speeds, so the work done by the turbine can also be increased by the same ratio.

On the other hand, if the weight of the turbine blade is reduced by 50% and the rotating speed is maintained, the centrifugal force acting on the turbine disk that supports the blade is halved, so the weight of the turbine disk can also be reduced by one half. Consequently, the weights of the turbine disk supporting shaft and the shaft-supporting case can also be reduced.

In either case, assuming constant work is done by the turbine, the weight of an aeronautical engine can be greatly reduced, so the weight of the airplane structure that supports the engine can also be reduced by several times. In consequence, the total load of the airplane can be increased, and region S), running cost can be reduced.

Further, front film cooling holes 7a are provided at the front edge portion, belly side, and rear side, and film-cooling is carried out by cooling air blown out of these front film cooling holes 7a. In addition, part of the cooling air blown out of the front film cooling holes 7a provided at the belly side of the blade 10 is passed through communication holes 8, and is supplied from the belly side of the blade 10 to the rear side, thereby the rear side is film-cooled. In this way, the entire blade 10 can be film-cooled.

Figure 4:
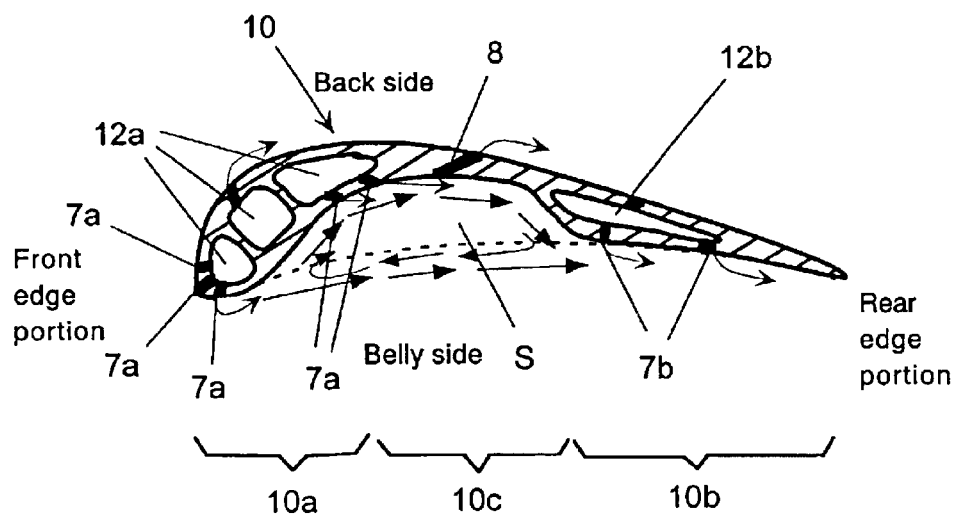
FIG. 4 is a typical sectional view showing the second embodiment of a turbine blade according to the present invention.

FIG. 4 is a typical sectional view of the thin-walled light cooling turbine blade in the second embodiment of the present invention. The turbine blade 10 is composed of a front blade portion 10a, a rear blade portion 10b and a solid-structured middle blade portion 10c.

The front blade portion 10a constitutes the front portion of the blade 10, which is composed of front blade portion cooling air flow passages 12a for passing cooling air in the interior thereof, front film cooling holes 7a for blowing the cooling air introduced into this front blade portion cooling air flow passages 12a out to the back and belly sides of blade 10.

The solid-structured middle blade portion 10c is located between the front blade portion.

The rear blade portion 10b constitutes an intermediate portion of blade 10. The rear blade portion 10b is provided in the interior thereof with rear cooling air passages 12b for passing the cooling air, and rear film cooling holes 7b for blowing the cooling air introduced into these blade portion cooling air passages 12b out to the back and belly sides of the blade 10. The middle blade portion 10c is composed in a solid, thin-walled structure, and is provided with a plurality of communication holes 8 for supplying part of the cooling air blown out of the front film cooling holes 7a on the belly side of blade 10 to the belly and back sides of blade 10. The belly side of blade 10 forms a recess portion towards the back side.

The present embodiment is a modification of the aforementioned first embodiment by providing rear cooling air passages 12b in the rear blade portion 10b of the thin-walled light cooling turbine blade. In addition in this configuration, high-temperature gas enters once from the combustor and branches in the directions of the rear edge portion and the belly side at the belly side of the front edge portion of the turbine blade, forming separate two flows that are merged again at the belly side of the rear edge portion. The region where these flows are separate from each other (separation region S) embodies the same flow potential as a thick-walled blade shape. Based on this configuration, the cooling performance at the rear edge portion can be improved.

The aforementioned configuration is inferior to the first embodiment in terms of light turbine blade. However, in view of the cooling performance of the turbine blade, the former is superior, so the present configuration satisfactorily provides film-cooling at the rear edge portion, while achieving a lighter turbine blade.

In addition, according to the present embodiment, part of cooling air blown out of the front film cooling holes 7a provided on the belly side of the blade 10 is supplied to the back side from the belly side of blade 10 through communication holes 8, thereby the back side is film-cooled. Thus, the entire blade 10 can be film-cooled.

The turbine blade according to the present invention should not be limited only to the above-mentioned illustrated examples, but can of course be modified or changed as far as the claims of the present invention are not exceeded.

As described above, according to the turbine blade of the present invention, part or most of the turbine blade can be made with a thin-walled solid structure, thus the weight of the turbine blade can be reduced, the rotating speed of the turbine can be increased, and the performance of the gas turbine can be improved.

The present invention has been explained using a number of preferred embodiments, however, it should be understood that the scope of rights covered by the present invention is not limited only to these embodiments. Conversely, the scope of rights of the present invention should include all modifications, corrections, and equivalent entities in the scope of the attached claims.

What is claimed is:

1. A thin-walled lightweight cooled turbine blade comprising:
   a front blade portion constituting a front portion of the blade;
   a rear blade portion constituting a rear portion of the blade; and
   a middle blade portion located between the front blade portion and the rear blade portion and constituting an intermediate portion of the blade, wherein
   the front blade portion is comprised of front cooling air passages that introduced cooling air into the interior thereof and front film cooling holes for blowing out the cooling air from the front cooling air passages to back and belly sides of the blade;
   the middle blade portion is a solid structure;
   the belly side of the middle blade portion forms a recess portion towards the back side of the middle blade portion; and
   high-temperature gas flowing on the belly side of the blade branches once into two flows to the rear edge portion and along the belly side, and these branched high-temperature gas flows are merged again at the rear edge portion, thereby forming a separation region.

2. A thin-walled lightweight cooled turbine blade comprising:
   a front blade portion constituting a front portion of the blade;
   a rear blade portion constituting a rear portion of the blade; and
   a middle blade portion located between the front blade portion and the rear blade portion and constituting an intermediate portion of the blade, wherein
   the front blade portion is comprised of front cooling air passages that introduce cooling air into the interior thereof, and front film cooling holes for blowing out the cooling air from the front cooling air passages to back and belly sides of the blade;
   the middle blade portion is a solid structure;
   the belly side of the middle blade portion forms a recess portion towards the back side thereof, wherein the middle blade portion and the rear blade portion comprise communication holes communicating between the belly side and the back side of the blade that supplies a part of the cooling air from the belly side to the back side thereof; and
   high-temperature gas flowing on the belly side of the blade branches once into two flows to the rear edge portion and along the belly side, and these branched high-temperature gas flows are merged again at the rear edge portion, thereby forming a separation region.

3. A thin-walled lightweight cooled turbine blade comprising:
   a front blade portion constituting a front portion of the blade;
   a rear blade portion constituting a rear portion of the blade; and
   a middle blade portion located between the front blade portion and the rear blade portion and constituting an intermediate portion of the blade, wherein
   the front blade portion is comprised of front cooling air passages that introduce cooling air into the interior thereof and front film cooling holes for blowing out the cooling air from the front cooling air passages to back and belly sides of the blade;
   the middle blade portion is a solid structure;
   the belly side of the middle blade portion forms a recess portion towards the back side thereof;
   the rear blade portion comprises in the interior thereof rear cooling air passages and rear film cooling holes for blowing out the cooling air from the rear cooling air passages to the back and belly sides of the blade; and
   high-temperature gas flowing on the belly side of the blade branches once into two flows to the rear edge portion and along the belly side, and these branched high-temperature gas flows are merged again at the rear edge portion, thereby forming a separation region.

4. The thin-walled lightweight cooled turbine blade specified in claim 3, wherein
   the middle blade portion comprises communication holes for supplying part of the cooling air blown out from the front film cooling holes, from the belly side of the blade to the back side thereof.

* * * * *